United States Patent [19]
Bowman et al.

[11] 3,812,330
[45] May 21, 1974

[54] AUTOMATIC CALIBRATION CIRCUIT FOR GAS ANALYZERS

[75] Inventors: Lloyd D. Bowman, Crescenta; Manohar G. Karhade, South Pasadena; Daniel I. Schneiderman, Hollywood, all of Calif.

[73] Assignee: Dasibi Corporation, Glendale, Calif.

[22] Filed: Aug. 18, 1972

[21] Appl. No.: 281,819

[52] U.S. Cl....... 235/92 CC, 235/92 R, 235/92 EV, 235/92 FQ, 324/79 D
[51] Int. Cl. .......................................... G06m 3/04
[58] Field of Search ....... 235/92 EV, 92 FQ, 92 PE, 235/92 CC; 324/78 D, 79 D

[56] References Cited
UNITED STATES PATENTS
3,651,414  3/1972  Jamieson ................... 235/92 PE
3,612,836  10/1971 Jordan ....................... 235/92 FQ

Primary Examiner—Paul J. Henon
Assistant Examiner—Robert F. Gnuse
Attorney, Agent, or Firm—Lyon and Lyon

[57] ABSTRACT

A circuit for automatically correcting the electronic calibration count in a system for measuring the concentration of a radiation absorbing agent in a gas mixture. The ideal calibration count is a digital number which is proportional to a detector signal determined by the Beer-Lambert Law.

10 Claims, 3 Drawing Figures

AUTOMATIC CALIBRATION CIRCUIT FOR GAS ANALYZERS

BACKGROUND OF THE INVENTION

This invention relates to an automatic calibration circuit utilized in gas analyzers and more particularly to gas analyzers which measure the concentration of a radiation absorbing agent in a gas mixture.

A preferred embodiment of the present invention is illustrated in combination with apparatus for measuring the concentration of a radiation absorbing agent, which apparatus is the subject matter of a co-pending application Ser. No. 115,316, filed Feb. 16, 1971 entitled "APPARATUS FOR MEASURING THE CONCENTRATION OF A RADIATION ABSORBING AGENT" and assigned to the same assignee as the instant invention. The construction and operation of the measuring apparatus is explained in detail in the above-mentioned co-pending application.

It has been found that an automatic calibration circuit is particularly desirable for gas monitoring systems of the type utilizing a plurality of absorption chambers or the type as in the above-mentioned application utilizing a single absorption chamber. In systems which compare the radiation signals produced with and without a radiation absorbing agent to obtain an indication of the amount of the agent present, inaccuracies occur which are unacceptable when measuring in a range of parts per million. In general, the factors which lead to inaccuracies in the system are those which involve degradation in a sample detector signal. Problems which will degrade the sample detector signal include clouding of the entrance window of an absorption chamber, impurities such as dust on the inner walls of the absorption chamber, differences in gains of the various detectors and imperfections in the thermal tracking of the various detectors.

The foregoing problems may be minimized or eliminated by providing in a preferred embodiment of my invention an automatic calibration circuit which provides automatic correction of the electronic calibration count (the detector signal) which is received by a sample detector when radiation is passed through a gas mixture containing zero concentration of a radiation absorbing agent.

SUMMARY OF THE INVENTION

It is an object of this invention to provide an automatic calibration circuit which will allow associated gas analyzers to operate in long term unattended monitoring applications with an improved measurement precision.

It is also an object of this invention to provide an automatic calibration circuit which will allow associated gas analyzers to operate with an improved measurement precision of better than 0.001 percent.

It is another object of this invention to provide an automatic calibration circuit to achieve automatic span stabilization.

It is a further object of this invention to utilize an automatic calibration circuit in combination with gas comparison apparatus to create a constant reference to the apparatus thereby resulting in highly accurate data and enabling long term unattended applications.

Briefly stated, and according to one aspect of my invention, the foregoing objects are achieved by providing an automatic calibration circuit utilizing a reversible counter in association with a reference digital electrometer and a second reversible counter in conjunction with a sample digital electrometer to provide an automatic correcting of the electronic calibration count in continuous gas monitoring systems.

BRIEF DESCRIPTION OF THE DRAWINGS

The invention both as to its organization and principle of operation together with further objects and advantages thereof may better be understood by referring to the following detailed description of an embodiment of the invention when taken in conjunction with the accompanying drawings in which.

DESCRIPTION OF THE PREFERRED EMBODIMENTS

The automatic calibration circuit of this invention will be shown in combination with a gas analyzer of the type which analyzes the amount of radiation absorbing agent in a gas mixture. However, it is not intended that the scope of this invention be limited to this particular application. It will also be assumed, for illustrative purposes, that the gas measurement equipment will utilize radiation in the form of ultra-violet light and will detect the radiation absorbing agent of ozone in an air mixture. However, the use of the term "light" is not intended to be limited to a source emitting radiation in the visible spectrum, but is used herein as a convenient term in a broad sense to refer to the various sources of useful radiation including non-visible acoustic and radio frequency radiation that may be involved.

The electronic calibration count which is to be automatically corrected to provide for automatic calibration will ideally be a digital number proportional to the detector current $I_o$ in the Beer-Lambert Law:

$I_o = e^{-act}/I_f$ where, $I_f =$ photo current of absorbed light, $I_o =$ photo current for zero concentration of ozone, $a =$ absorption coefficient at 2,537 $A°$ (2.74 × 10$^4$ cm$^{-1}$), $c =$ concentration of ozone in parts per million by volume, $t =$ length of absorption chamber in centimeters, and $e =$ the natural logarithmic base.

Since a given concentration of ozone results in a predictable attenuation of $I_o$, the ideal calibration count is initially determined from the Beer-Lambert Law. The automatic calibration circuit of this invention holds the elecronic calibration count constant on every cycle of the ozone monitor readout in a manner to be described later.

The propensity of different gases or vapors to absorb radiation of a certain wavelength is frequently used to determine the presence or concentration of these gases or vapors. The particular wavelength of radiation used is, of course, chosen so that is is significantly absorbed by the gas to be measured and is not significantly absorbed by other gases which are expected to be present. Wavelengths in the ultraviolet region are significantly absorbed by gases such as ozone, sulfur dioxide and vapors such as acetone and benzene. Infra-red radiations are readily absorbed by gases such as $CO_2$, $H_2S$, HCN, and $H_2O$.

Figure 1:
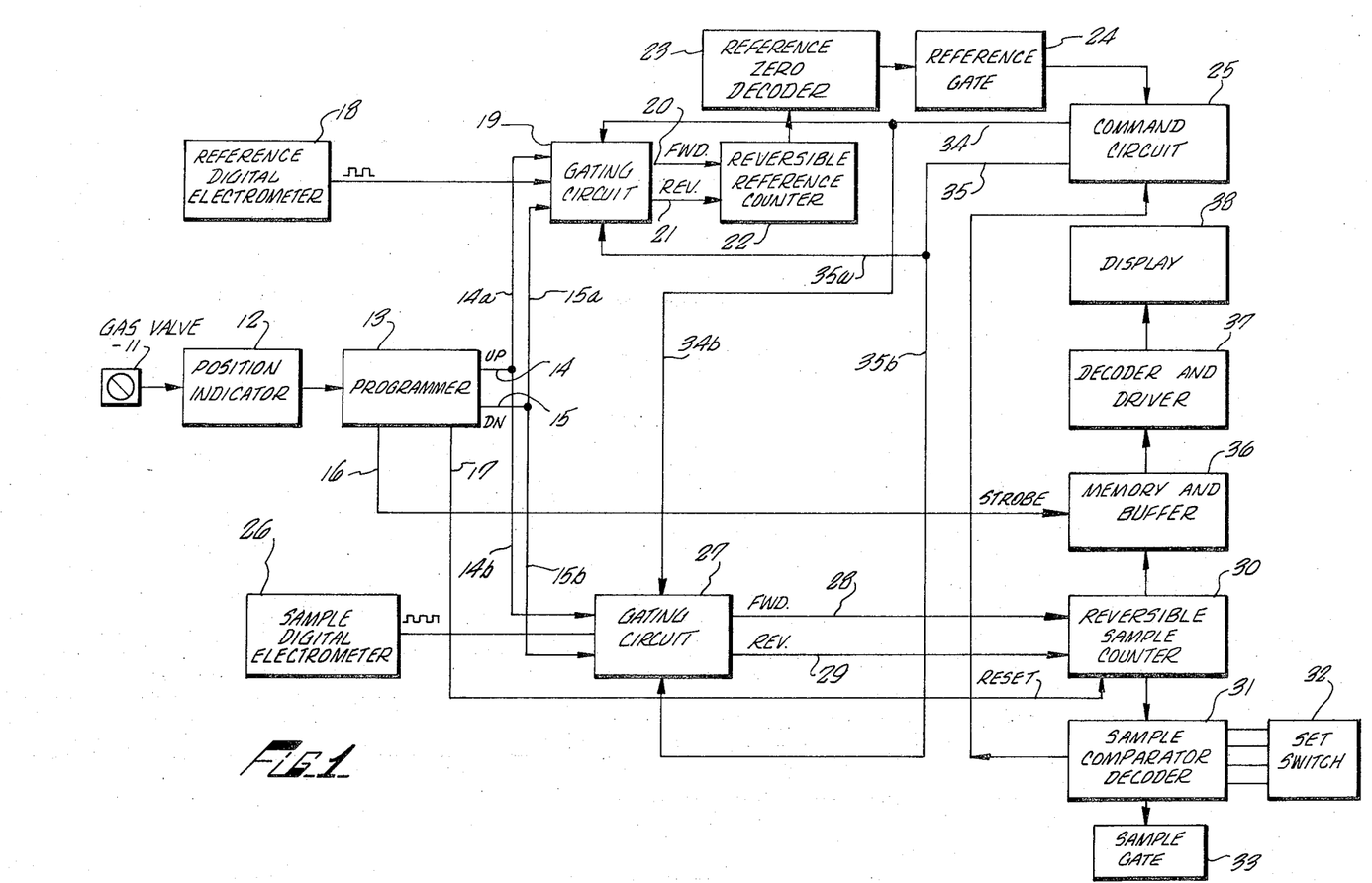
FIG. 1 is a block diagram illustrating an exemplary embodiment of the basic concepts of a gas measuring system utilizing an automatic calibration circuit in accordance with this invention.

Referring now to FIG. 1, there is illustrated a gas valve 11 connected to a position indicator 12. The position indicator 12 will indicate the position of the gas valve 11 to the programmer 13 which in turn will either initiate an up or down count. In the present illustrative form of position indicator 12 and gas valve 11, a single absorption chamber gas measuring system is depicted. However, the positioner 12 could readily be utilized to indicate to the programmer 13 which absorption chamber in a dual absorption chamber system is being utilized. This information would, of course, be taken into consideration along with the absence of inclusion of any radiation absorbing agent in either absorption chamber.

Programmer 13 has an up count output line 14 which divides into lines 14a and 14b, and a down count output line 15 which divides into lines 15a and 15b. Programmer 13 also provides a line 16 for a strobe signal and a line 17 for a reset signal, both to be described later.

Figure 3:
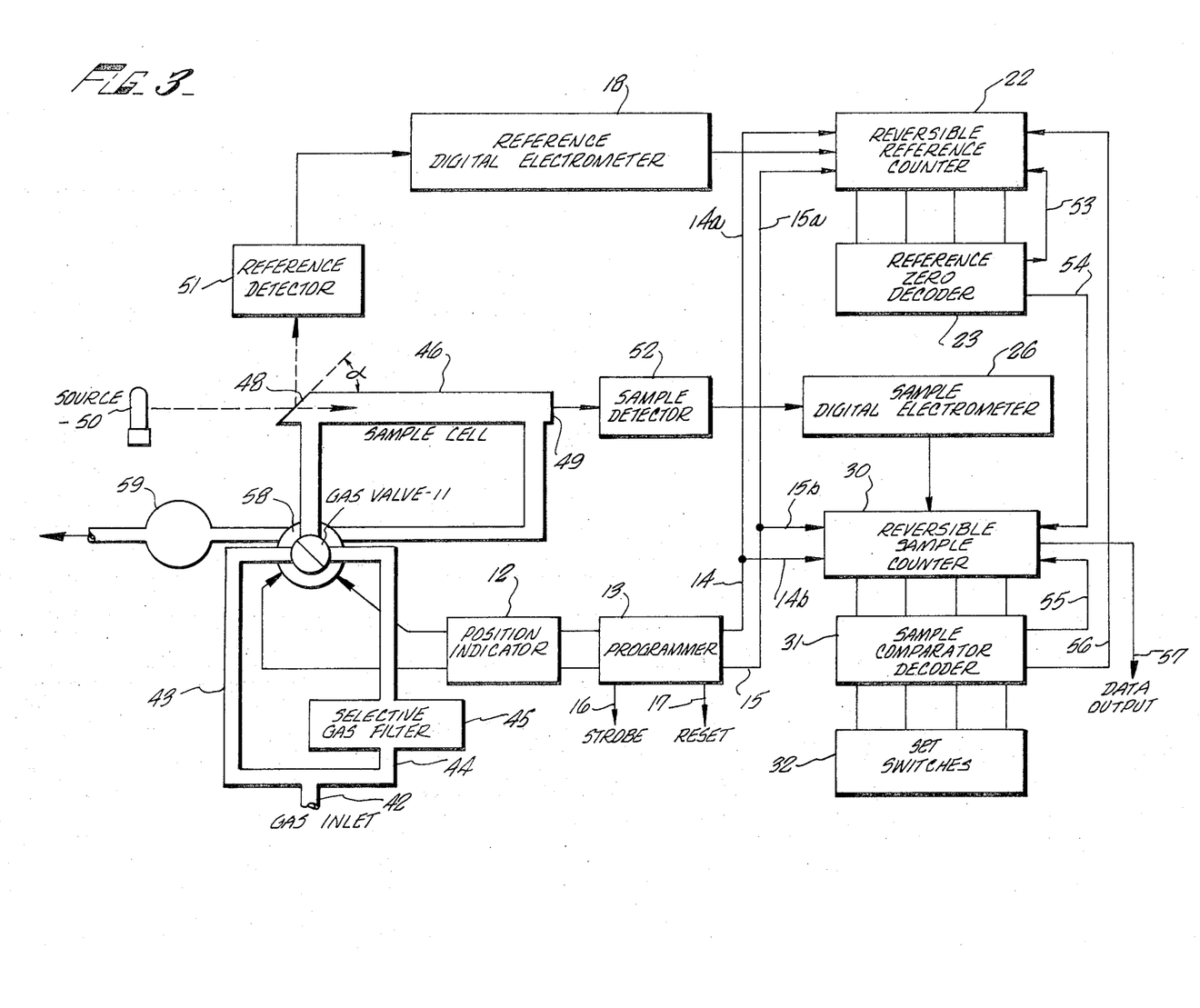
FIG. 3 is a general block diagram illustrating an exemplary embodiment of the basic concepts of the automatic calibration circuit utilized in a single absorption chamber type of apparatus for measuring the concentration of a radiation absorbing agent in accordance with this invention.

Reference digital electrometer 18 is utilized to measure the quantity of radiation, or light, striking a reference detector to be described in FIG. 3. The reference digital electrometer 18 will produce a digital indication of the amount of light striking the reference detector and provides an input to a gating circuit 19. Gating circuit 19 also receives inputs from lines 14a and 15a programmer 13 to enable gating circuit 19, in a manner known in the art. Gating circuit 19 is connected to a reversible reference counter 22 through forward line 20 and reverse line 21. Depending upon the signal from gating circuit 19, either the forward or reverse line will provide a signal to activate the reversible reference counter 22 to count in either the forward or reverse direction. The output of reversible reference counter 22 is connected through a reference zero decoder 23 and a reference gate 24 to a command circuit 25.

The reference zero decoder 23 will provide the proper output to the reference gate 24 when the reference counter 22 (counting in reverse) reaches a count of zero. When a zero count is reached in the reversible reference counter 22, the reference gate 24 is activated and the command circuit 25 provides a signal through lines 34 and 34a which disables gating circuit 19 and a signal through lines 34 and 34b which disables gating circuit 27.

A sample digital electrometer 26 is analogous to reference digital electrometer 18 and provides a digital output of the quantity of light striking a sample detector to be described in FIG. 3. This digital output provides and input to the gating circuit 27 along with inputs from lines 14b and 15b from the programmer 13. Gating circuit 27 has outputs connected to reversible sample counter 30 through a forward line 28 and a reverse line 29. Reversible sample counter 30 will be operated in either the forward or reverse direction in response to a signal from the gating circuit 27 through either the forward line 28 or the reverse line 29.

The reservible sample counter 30 is connected through a sample comparator decoder 31 and a sample gate 33 to the command circuit 25. The sample comparator decoder 31 is provided with and connected to a set switch 32 which will allow an operator to insert an ideal calibration count into the system.

The sample comparator decoder 31 compares the ideal calibration count as determined by the set switches 32 with the up count of the reversible sample counter 30 and, when the ideal calibration count is reached, the sample gate 33 is enabled or activated, and the command circuit 25 provides a signal which disables gating circuit 19 through lines 35 and 35a and which disables gating circuit 27 through lines 35 and 35b.

Referring back to the programmer 13, the reversible sample counter 30 will be reset by programmer 13 through line 17 after a readout is finally achieved. Readout will occur when programmer 13 provides a strobe signal through line 16 to allow a memory and buffer unit 36 to read out the count after the reversible sample counter 30. Read out will occur after the reversible sample counter 30 has counted up to the ideal calibration count and counted down until the reversible reference counter 22 reaches zero.

The contents of the memory and buffer unit 36 are utimately displayed in display unit 38, and are supplied thereto through decoder and driver unit 37 in a manner well known in the art.

In operation, when a gas mixture is in an absorption chamber in which no radiation absorbing agent is included, programmer 13 initiates an up count through output line 14 to both reversible reference counter 22 and reversible sample counter 30. Both gating circuits 19 and 27 are enabled at this time in order to allow their respective counters to count in the forward, or up, direction. When the reversible sample counter 30 reaches the value of the calibration count, as determined by the set switches 32, the command circuit 25 is activated through the sample gate 33. The command circuit 25 in turn provides an output signal on line 35 to disable both gating circuits 19 and 27. These disabled gating circuits thus prevent signals from passing therethrough, thereby disabling reversible reference counter 22 and reversible sample counter 30.

When the gas containing the radiation absorbing agent is supplied into the absorption chamber, programmer 13 initiates a down count through output line 15 and enables gating circuits 19 and 27 to allow counter 22 and 30 to count in the reverse, or down, direction. When the reversible reference counter 22 reaches zero, reference gate 24 is activated through decoder 23, and the command circuit 25 disables gating circuits 19 and 27 through line 34. This de-activation of the gating circuits 19 and 27 disables the reversible reference counter 22 and the reversible sample counter 30.

Programmer 13 now activates a strobe signal through line 16 in a manner well known in the art to read out the count in the reversible sample counter 30 through the memory and buffer unit 36 to the count on display 38. The display 38 will show the amount of radiation absorbing agent included in the gas mixture in parts per million. Prior to a complete repeat and recycle of the operation, programmer 13, through line 17, will reset reversible sample counter 30 so that the cycle may be repeated.

Figure 2:
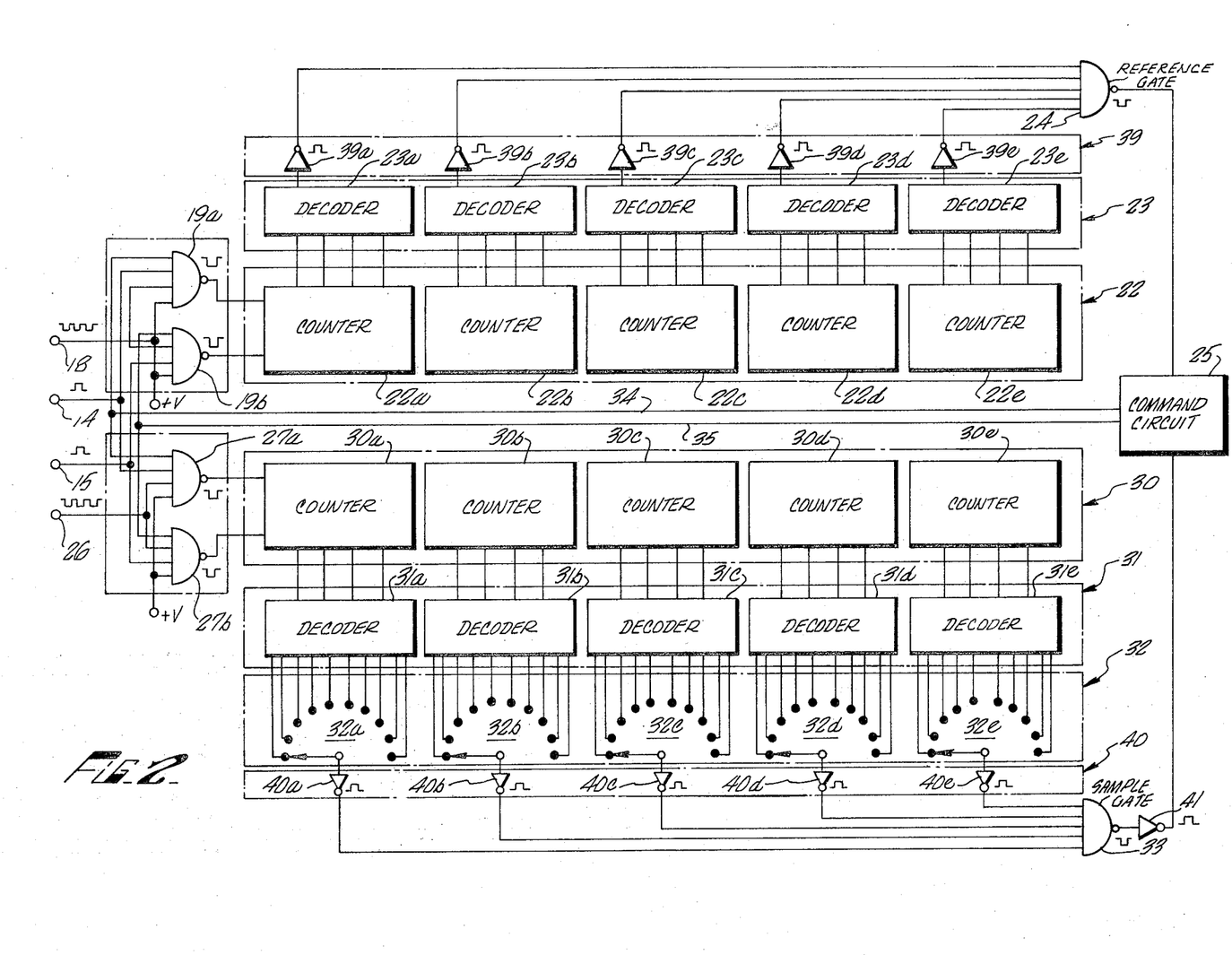
FIG. 2 is a more detail block logic diagram of an embodiment of the logic of the automatic calibration circuit divorced from gas measuring or monitoring equipment in accordance with this invention.

Turning now to FIG. 2, the same illustrates components of FIG. 1 in more detail. The gating circuit 19 of FIG. 1 includes "and" gate 19a and, "and" gate 19b. "And" gates 27a and 27b form gating circuit 27 of FIG. 1. Gates 19a and 19b receive an input from the reference digital electrometer 18 and an input from a positive source voltage. Likewise, gates 27a and 27b receive inputs from sample digital electrometer 26 and from a positive source voltage.

When an up count or forward direction count is desired, the up count output line 14 (from programmer 13) is applied to gates 19a and 27a. Line 35 from the command circuit 25 provides the proper enabling signal to activate gates 19a and 27a which in turn enable counter 22 and counter 30 to count in the forward, or up, direction the signal produce by the reference digital electrometer 18.

When a down count or reverse direction count is desired, the down output line 15 (from programmer 13) is applied to gates 19b and 27b. Line 34 from the command circuit 25 provides the proper enabling signal to activates gates 19b and 27b which in turn enable counter 22 and counter 30 to count in the down, or reverse direction the signal produced by the sample digital electrometer 26.

Gates 19a and 19b are connected to a counter 22 comprising counter stages 22a through 22e each of which are in turn connected in a manner known in the art to a decoder 23 comprising decoder stages 23a through 23e. The outputs of the decoder 23 are inverted through an inverter unit 39 comprising inverters 39a through 39e to provide the proper input to reference gate 24 and, therefore, to enable the reference gate 24 when the counter 22 has returned to zero. That is, the reference gate 24 provides an output signal when the output of counter 22 is zero. Reference gate 24 is connected to the command circuit 25, and the latter disables gates 19b and 27b through line 34, and thus disable counters 22 and 30 on the down count when counter 22 reaches zero.

Gates 27a and 27b are connected to a counter 30 comprising counter stages 30a through 30e, and each individual counter stage is connected in turn to a decoder 31 comprising decoder stages 31a through 31e in a manner well known in the art. Decoder 31 is further connected to a sample gate 33 through set switch unit 32 comprising switches 32a through 32e and inverter unit 40 comprising inverters 40a through 40e. When the decoder 31, by comparing the count in the set switch unit 32 to the count in the counter 30, reaches the point where the count in the counter 30 is equal to the calibration count set in the set switch unit 32, sample gate 33 is activated and its output is fed through inverter 41 to the command circuit 25. The command circuit 25 in turn deactivates gates 19a and 27a through line 35, thereby disabling counter 22 and counter 30.

In operation, an up count is initiated through output line 14 to enable the counters 22 and 30 to count in a forward direction when the gas to be measured does not contain any radiation absorbing agent. The utput signal from gates 19a and 27a are inverted and fed into counter units 22 and 30 respectively. Decoder 31 will compare the count in counter 30 with the calibration count applied to set switch unit 32. When the count in counter 30 is equal to the calibration count in set switch unit 32, a signal, after being inverted, will be applied to sample gate 33, and sample gate 33 will again invert the signal, and inverter unit 41 finally inverts the signal once again, to provide a signal to command circuit 25 to deactivate gates 19a and 27a through line 35 and thus in turn disable counters 22 and 30.

The down count is initiated through output line 15 to enable the counters 22 and 30 to count in a reverse direction when the gas to be measured does contain the radiation absorbing agent. The output signal from gates 19b and 27b are inverted and fed into counters 22 and 30 respectively. Decoder 23 will compare the count in counter 22 with zero, and when this condition is met, a signal after being inverted by inverter unit 39, will be applied to the reference gate 24. Reference gate 24 will invert the signal to provide a signal to command circuit 25 to deactivate gates 19b and 27b through line 34 and thus in turn disable counters 22 and 30.

FIG. 3 illustrates a gas inlet 42 having two passageways 43 and 44. Passageway 43 leads directly to gas valve 22 and passageway 44 leads to gas valve 11 through a scrubber or selective gas filter 45. This filter removes ozone or other gas to be analyzed from the incoming gas sample. For ozone, a fixed bed filter of manganese dioxide has been found satisfactory, although other filter materials may be used. The gas valve 11 is continuously cycled or rotated to alternately provide at the output of valve 11 filtered gas from passageway 44 and unfiltered gas from passageway 43. The outlet of the gas valve 11 feeds into an absorption chamber or sample cell 46 through inlet line 47. A check valve may be included in gas valve 11 to prevent unfiltered air in passageway 43 from moving into the outlet line of the filter 45.

The sample cell 46 has an angled window 48 at the light entry thereof and a second window 49 at its other or light exit end. These windows 48 and 49 are transparent to 2,537 A° in an exemplary embodiment of the present invention. The specific angle $\alpha$ of window 48 is not critical but construction is simplified by the use of the 45° angle. A light source 50 provides light which both passes through the sample cell 46 and is reflected by window 48 to a reference detector 51. For ozone, a Mercury vapor quartz lamp may be used, such as that sold under the tradename Pen Ray Quartz Lamp Model 11 SC-2 by Ultra Violet Productions, Inc. The light from light source 50 which is not reflected by the angled window 48 passes through the sample cell 46 through window 49 to a sample detector 52. Photodiode detectors may be used for detectors 51 and 52, such as those sold under designation R-404 by Hamamatsu TV Company, Ltd. Reference detector 51 is electrically connected to a reference digital electrometer 18 which measures the quantity of light striking the reference detector 51. The reference digital electrometer 18 is connected to a reversible reference counter 22 which measures the cumulative amount of light striking the reference detector 51. The reversible reference counter 22 is connected to a reference zero decoder 23 in a manner well known in the art. The reference zero decoder 23 provides an output on the down count of reversible reference counter 22 when the count in counter 22 is zero. When zero is obtained in the reversible reference counter 22 (on the down count) reference zero decoder 23 disables the reversible reference counter 22 through line 53 and the reversible sample counter 30 through line 54.

The sample detector 52 is connected to a second digital electrometer or sample digital electrometer 26 which in turn is connected to a reversible sample counter 30. The reversible sample counter 30 is connected in a manner well known in the art to a sample comparator decoder 31 which in turn is connected to a set switch unit 32. When the reversible sample counter 30 reaches the ideal calibration count as set in set switch unit 32, the sample comparator decoder 31 disables the reversible sample counter 30 through line 55 and reversible reference counter 22 through line 56.

After completion of an up/down count of both reversible counters 22 and 30, the reversible sample counter 30 through data output line 57 will contain a count equal to the ozone or radiation absorbing agent concentration level in the air or gas being measured in parts per million.

Programmer 13 is shown with an output line 16 for a strobe signal and a reset line 17 for a reset signal. Programmer 13 which is connected to the gas valve 11 through the position indicator 12 has an output line 14 which delivers a signal to enable an up count through lines 14a and 14b to reversible reference counter 22 and reversible sample counter 30 respectively. Likewise, line 15 delivers a signal to enable a down count through lines 15a and 15b to reversible reference counter 22 and reversible sample counter 30 respectively. The signal on line 15 and 16 is in response to the position of gas valve 11.

A plenum chamber 58 is shown surrounding gas valve 11. The chamber 58 causes a lower gas pressure to exist around the exterior of the gas valve 11 than its interior. Thus, any gas which leaks from valve 11 does not enter the absorption inlet line 47, but instead is exhausted by the exhaust pump 59. This decreases the chance for contamination of the sample cell 46 which leads to erroneous measurements.

In operation, the apparatus of FIG. 3 operates on a sample of air containing ozone and the manner to follow. The air to be measured is supplied to gas inlet 42 and enters passageways 43 and 44. Filter 45 is adapted to selectively remove all the ozone from the inlet air, and gas valve 11 in a first position permits the passage of filtered air into line 47 and thus into the sample cell 46. After the filtered air has passed into the cell 46, for a time sufficient to exhaust the cell 46 if unfiltered gas is contained therein, a measurement is started. The light source 50 is continuously operated while the instrument is being used. Reference digital electrometer 18 measures the amount of light impinging upon the reference detector 51 from the entry window 48. The sample digital electrometer 26 likewise measures the amount of light impinging upon the sample detector 52 which receives light after it passes through the filtered air in sample cell 46. When the gas mixture is free of ozone, the position indicator 12 will be in a first position and supply a signal to programmer 13 to initiate the up or forward count of the reversible reference counter 22 and the reversible sample counter 30. The sample comparator decoder 31 compares the count in the reversible sample counter 30 to the ideal calibration count set into the set switch unit 32, and when the count in the reversible sample counter 30 is equal to the ideal calibration count, the sample comparator decoder 31 disables the reversible sample counter 30 and the reversible reference counter 22.

Sufficient time is permitted to allow the sample cell 46 to be flushed of filtered air and to be completely filled with air containing the ozone to be measured. This is a selected or pre-determined time lag and allows the sample cell 46 to be completely filled with the air to be analyzed. The time lag is a function of the speed of operation of the valve 11 and a rotation thereof once in eight seconds has been found suitable.

Again the reference digital electrometer will measure the light impinging upon reference detector 51 and the sample digital electrometer 26 will measure the light impinging upon sample detector 52 but the position indicator 12 in a second position will provide a signal to programmer 13 to initiate the down or reverse count of the reversible reference counter 22 and the reversible sample counter 30.

When the count in the reversible reference counter 22 is zero, reference zero decoder 23 deactivates the reversible reference counter 22 and the reversible sample counter 30, thus, the remaining count on the reversible sample counter 30 corresponds to the difference in the total amount of light which passes through the filtered air as compared with that which passes through the unfiltered air. This difference is directly correlated with the ozone level in the air.

By providing a continuous comparison of the amount of light which enters each of the detectors, a very accurate ozone reading may be obtained. Ozone levels from 0.01 parts per million to 10.00 parts per million volume concentration are measurable. It can further be seen that the sampling and reading can be carried out semi-continuously and a cycle time of eight seconds may be readily achieved. Inlet air temperatures may vary from 32°F. to 120°F.

According, it has been shown that by providing an automatic calibration circuit for a gas measuring or monitoring system that a reliable, accurate system may be achieved.

While embodiments and applications of this invention have been shown and described, it will be apparent to those skilled in the art that many more modifications are possible without departing from the inventive concepts herein described. The invention, therefore, is not to be restricted except as is necessary by the prior art and by the spirit of the appended claims.

What is claimed as new and desired to be secured by Letters Patent of the United States is:

1. An automatic calibration circuit for apparatus used for measuring the concentration of a radiation absorbing agent in a gas mixture, comprising:
 a sample counter capable of counting in forward and reverse directions;
 a reference counter capable of counting in forward and reverse directions;
 first means for activating said sample counter and said reference counter in the forward direction in response to a first digital signal representative of the quantity of radiation passed through the gas mixture without the radiation absorbing agent;
 means for comparing the count in said sample counter with a preset calibration count;
 first means for disabling said reference counter and said sample counter when the count in said sample detector is equal to the preset calibration count;

second means for activating said sample counter and said reference counter in the reverse direction in response to a second digital signal representative of the quantity of radiation passed through the gas mixture with the radiation absorbing agent; and second means for disabling said reference counter and said sample counter when the count in said reference counter is at a predetermined value.

2. An automatic calibration circuit for apparatus used for measuring the concentration of a radiation absorbing agent in a gas mixture utilizing a first digital signal representative of the quantity of radiation passed through the gas mixture without the radiation absorbing agent and a second digital signal representative of the quantity of radiation passed through the gas mixture with the radiation absorbing agent, the automatic calibration circuit comprising:

a sample counter capable of counting in forward and reverse directions;

a reference counter capable of counting in forward and reverse directions;

first means for activating said sample counter and said reference counter in the forward direction in response to the first digital signal;

means for comparing the count in said sample counter with a preset calibration count;

first means for disabling said reference counter and said sample counter when the count in said sample counter is equal to the preset calibration count;

second means for activating said sample counter and said reference counter in the reverse direction in response to the second digital signal; and second means for disabling said reference counter and said sample counter when the count in said reference counter is zero.

3. An automatic calibration circuit used for appatatus measuring the concentration of a radiation absorbing agent in a gas mixture including a first digital signal representative of the quantity of radiation passed through the gas mixture without the radiation absorbing agent and a second digital signal representative of the quantity of radiation passed through the gas mixture with the radiation absorbing agent, the calibration circuit comprising:

a sample reversible counter and a reference reversible counter;

first means for activating said sample reversible counter and said reference reversible counter in a first direction in response to the first digital signal;

means for comparing the count in said sample reversible counter with a preset calibration count;

first means for disabling said reference reversible counter and said sample reversible counter when the count in said sample reversible counter is equal to the preset calibration count;

second means for activating said sample reversible counter and said reference reversible counter in a second direction in response to the second digital signal; and second means for disabling said reference reversible counter and said sample reversible counter when the count in said reference reversible counter is zero.

4. The automatic calibration circuit is in claim 3 wherein the first direction is a forward direction and the second direction is a reverse direction.

5. An automatic calibration circuit used for apparatus measuring the concentration of a radiation absorbing agent in a gas mixture including a reference digital electrometer for producing a first digital signal representative of the quantity of radiation passed through the gas mixture without the radiation absorbing agent and a sample digital electrometer for producing a second digital signal representative of the quantity of radiation passed through the gas mixture with the radiation absorbing agent, the automatic calibration circuit comprising:

a sample reversible counter capble of counting in forward and reverse directions;

a reference reversible counter capble of counting in forward and reverse directions;

first means for activating said sample reversible counter and said reference reversible counter in the forward direction in response to the first digital signal;

means for comparing the count in said sample reversible counter with a preset calibration count;

first means for disabling said reference reversible counter and said sample reversible counter when the count in said sample reversible counter is equal to the preset calibration count;

second means for activating said sample reversible counter and said reference reversible counter in the reverse direction in response to the second digital signals; and second means for disabling said reference reversible counter and said sample reversible counter when the count in said reference reversible counter is zero.

6. An automatic calibration circuit used for apparatus measuring the concentration of the radiation absorbing agent in a gas mixture, comprising:

means for producing a first digital signal representative of the quantity of radiation passed through the gas mixture without the radiation absorbing agent;

second means for producing a second digital signal representative of the quantity of radiation passed through the gas mixture with the radiation absorbing agent;

a sample reversible counter capable of counting in forward and reverse directions;

a reference reversible counter capable of counting in forward and reverse directions;

first means for activating said sample reversible counter and said reference reversible counter in the forward direction in response to the first digital signal;

means for comparing the count in said sample reversible counter with a preset calibration count;

first means for disabling said reference reversible counter and said sample reversible counter when the count in said sample reversible counter is equal to the preset calibration count;

second means for activating said sample reversible counter and said reference reversible counter in the reverse direction in response to the second digital signals;

second means for disabling said reference reversible counter and said sample reversible counter when the count in said reference reversible counter is zero; and means for comparing the count of the sample counter with the increased calibration count.

7. The automatic calibration circuit as in claim 6 wherein the radiation absorbing agent is ozone and including a radiation source emitting light waves in the ultraviolet range.

8. The automatic calibration circuit as in claim 7 wherein said radiation source is a Mercury vapor source.

9. An apparatus used for measuring the concentration of a radiation absorbing agent in a gas mixture, comprising:
   a first means for receiving a first gas mixture with the radiation absorbing agent in the gas mixture;
   a second means for receiving a second gas mixture without the radiation absorbing agent;
   a sample forming an absorption chamber, said sample cell having a radiation entry pathway and a radiation exit pathway;
   a valve means having a first and a second position connecting said first means to said sample cell in a first position and connecting said second means to said sample cell in a second position;
   a radiation source having a first area, said first area position for directing radiation through said radiation entry pathway of said sample cell thereby passing through said first gas mixture when said valve means is in the first position, and through said second gas mixture when said valve means is in the second position;
   a first detector means for receiving radiation from said first area of said radiation source;
   a second detector means for receiving radiation from said first area of said radiation source after the radiation has passed through the gas mixture of said sample cell at the radiation exit pathway of said sample cell;
   a first measuring means for measuring the quantity of radiation received by said first detector means;
   a second measuring means for measuring the quantity of radiation received by said second detector means; and
   a comparator means coupled with said first and second measuring means for determining the difference in radiation absorption between the first gas mixture and the second gas mixture;
   wherein the improvement comprises:
      a sample reversible counter capable of counting in forward and reverse directions;
      a reference reversible counter capable of counting in forward and reverse directions;
      first means for activating said sample reversible counter and said reference reversible counter in the forward direction in response to a first digital signal representative of the quantity of radiation passed through the second gas mixture;
      means for comparing the count in said sample reversible counter with a preset calibration count;

first means for disabling said reference reversible counter and said sample reversible counter when the count in said sample reversible counter is equal to the preset calibration count;
   second means for activating said sample reversible counter and said reference reversible counter in the reverse direction in response to a second digital signal representative of the quantity of radiation passed through the first gas mixture; and
   second means for disabling said reference reversible counter and said sample reversible counter when the count in said reference reversible counter is zero.

10. An automatic calibration circuit used for apparatus measuring the concentration of a radiation absorbing agent in a gas mixture, comprising;
   receiving means for receiving a first gas mixture with the radiation absorbing agent;
   a sample cell forming an absorption chamber, said sample cell having a radiation entry pathway and a radiation exit pathway;
   valve means having a first and a second position connected to said sample cell;
   a first passageway from said receiving means to said valve means, said valve being in the first position when passing the first gas mixtures through said first passageway to said first sample cell;
   a second passageway, including a filter for removing the radiation absorbing agent from the first gas mixture thereby forming a second gas mixture, from said receiving means to said valve means, said valve means being in the second position when passing the second gas mixture through said second passageway to said sample cell;
   a radiation source, having a first area, said first area positioned for directing radiation through said radiation entry pathway of said sample cell and through said radiation exit pathway of said sample cell thereby passing through said first gas mixture when said valve means is in said first position and through said second gas mixture when said valve means is in said second position;
   first detector means for receiving radiation from said first area of said radiation source;
   second detector means for receiving radiation from said first area of said radiation source after the radiation had passed through the gas mixture into the sample cell at the radiation exit pathway of said sample cell;
   first measuring means for measuring a quantity of radiation received by said first detection means;
   second measuring means for measuring the quantity of radiation received by said second detector means;
   a sample reversible counter connected to said second measuring means;
   a reference reversible counter connected to said first measuring means;
   first means for activating said sample reversible counter and said reference reversible counter in the forward direction in response to a first digital signal representative of the quantity of radiation passed through the gas mixture without the radiation absorbing agent;
   means for comparing the count in said sample reversible counter with a preset calibration count;
   first means for disabling said reference reversible counter and said sample reversible counter when the count in said sample reversible counter is equal to the preset calibration count;
   secon means for activating said sample reversible counter and said reference reversible counter in the reverse direction in response to a second digital signal representative of the quantity of radiation passed through the gas mixture including the radiation absorbing agent;

second means for disabling said reference reversible counter and said sample reversible counter when the count in said reference reversible counter is zero; and means for displaying a representation of the count remaining in said sample reversible counter after said sample reversible counter has been activated in the forward and reverse direction.

* * * * *